INVENTOR
JOHN V. SHARP
BY Ralph L Chappell
ATTORNEY

Nov. 27, 1951 J. V. SHARP 2,576,149

SPHERICAL TRIANGLE COMPUTER

Filed Nov. 14, 1945 8 Sheets-Sheet 2

INVENTOR
JOHN V. SHARP

BY [signature]
ATTORNEY

Nov. 27, 1951 J. V. SHARP 2,576,149

SPHERICAL TRIANGLE COMPUTER

Filed Nov. 14, 1945 8 Sheets-Sheet 3

INVENTOR
JOHN V. SHARP
BY [signature]
ATTORNEY

Nov. 27, 1951 J. V. SHARP 2,576,149

SPHERICAL TRIANGLE COMPUTER

Filed Nov. 14, 1945 8 Sheets-Sheet 4

INVENTOR
JOHN V. SHARP

BY [signature]
ATTORNEY

Nov. 27, 1951 J. V. SHARP 2,576,149

SPHERICAL TRIANGLE COMPUTER

Filed Nov. 14, 1945 8 Sheets-Sheet 5

INVENTOR
JOHN V. SHARP
BY Ralph L. Chappell
ATTORNEY

Nov. 27, 1951 J. V. SHARP 2,576,149

SPHERICAL TRIANGLE COMPUTER

Filed Nov. 14, 1945 8 Sheets-Sheet 6

Inventor
JOHN V. SHARP

Ralph L. Chappell

Attorney

Inventor
JOHN V. SHARP
By [signature]
Attorney

Nov. 27, 1951 J. V. SHARP 2,576,149

SPHERICAL TRIANGLE COMPUTER

Filed Nov. 14, 1945 8 Sheets-Sheet 8

Inventor
JOHN V. SHARP

By [signature]

Attorney

Patented Nov. 27, 1951

2,576,149

UNITED STATES PATENT OFFICE 2,576,149

SPHERICAL TRIANGLE COMPUTER

John V. Sharp, United States Navy

Application November 14, 1945, Serial No. 628,615

10 Claims. (Cl. 33—1)

(Granted under the act of March 3, 1883, as amended April 30, 1928; 370 O. G. 757)

This invention deals with computing mechanisms, particularly of the type which are adapted to solve navigational and other problems involving spherical trigonometry.

The object of this invention is to produce a device which is simple in construction, has relatively few parts, and is easy to operate; and which is adapted to automatically give desired solutions of any spherical or plane trigonometrical triangle problems.

Another object is to provide a computing device having four adjustments, corresponding to four mutually related variables in triangulation problems, so correlated by connecting mechanisms that if three of them are adjusted in accordance with the known values of three of the variables, respectively, the value of the fourth variable is immediately indicated by simultaneous automatic adjustment of the fourth.

Another object is to construct a device having four adjustable indicators mechanically so interconnected that they always indicate the true relations between some set of four determinate factors involving a particular spherical triangulation problem; and so that no indication can be changed without correspondingly affecting the other indications to maintain such relation.

Another object is to produce a device having four angularly adjustable indicators geared and interconnected mechanically so as to retain relative positions showing values mutually representing four determinate factors in some spherical triangulation problem.

Another object is to construct a computing device having four adjustable indicators interconnected so that when three of them are adjusted respectively to the corresponding values of three known factors defining some spherical triangle, the fourth indicator will simultaneously automatically show the value of a predetermined one of the remaining three factors defining the triangle.

A further object is to construct a computing device having four indicators mechanically interconnected in such manner that their indications will always follow a definite mutual relationship corresponding to that found between the values of the four corresponding variables in a trigonometric equation defining a spherical triangle, and that when any three of these indicators are manually set to indicate the corresponding values of three known variables the value of the fourth will be simultaneously automatically indicated on the fourth indicator.

Further and more specific objects will become apparent from the detailed description of some preferred forms of the present invention as disclosed in the accompanying drawings, wherein:

Figs. 1 to 3 are three views showing the general arrangement of indicators and their connecting parts comprising the essential features of one form of construction based on the present invention;

Fig. 3*a* is an enlarged partial view of Fig. 3 showing details of the vernier scale;

Fig. 4 shows partly in section, an instrument incorporating the above features but using vernier counter-type dials, geared to the connections, in place of the circumferential directly connected dials for the indicators shown in Figs. 1 to 3, and having a differential connection between two of the indicators for the purpose of getting values of the unknowns directly instead of obtaining their sum and difference as in the mechanism illustrated in Figs. 1 to 3;

Figure 1:
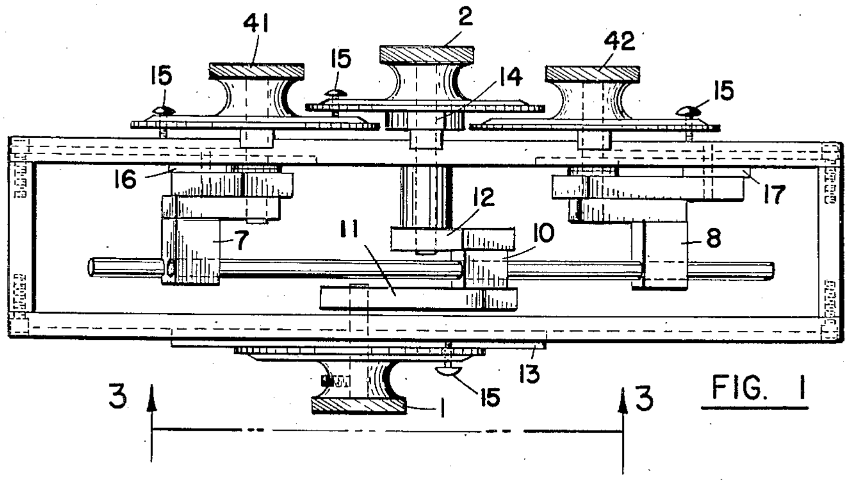

The forms of the device herein shown are merely illustrative of some of the combinations which might be used. They are all based on the following geometrical analysis:

*Geometric analysis of spherical triangle equations*

It is to be noted that the principal trigonometric equations used to solve problems related to a spherical triangle are as follows:

I. $\cos a = \cos b \cos c + \sin b \sin c \cos A$

II. $\cos A = -\cos B \cos C + \sin B \sin C \cos a$

III. $\dfrac{\sin A}{\sin a} = \dfrac{\sin B}{\sin b} = \dfrac{\sin C}{\sin c}$

These equations can be first reduced to equations expressed in cosines; and second they can be arranged in the form of the equations of a straight line passing through two points.

I. Where two sides of a spherical triangle, $b$ and $c$, and the included angle A are known the third side $a$ is usually obtained by the following formula:

(1) $\cos a = \cos b \cos c + \sin b \sin c \cos A$ or if the three sides are known, the angle A is obtained by the same formula rearranged and solved for cos A as follows:

(2) $$\cos A = \frac{\cos a - \cos b \cos c}{\sin b \sin c}$$

In order to express this equation entirely in cosines it is noted that:

(3) $\cos (b-c) = \cos b \cos c + \sin b \sin c$ and (4) $\cos (b+c) = \cos b \cos c - \sin b \sin c$ then by addition:

(5) $\cos (b-c) + \cos (b+c) = 2 \cos b \cos c$ and by subtraction:

(6) $\cos (b-c) - \cos (b+c) = 2 \sin b \sin c$

Then by substituting Equations 5 and 6 in Equation 2:

(7) $$\cos A = \frac{\cos a - \frac{1}{2}[\cos (b-c) + \cos (b+c)]}{\frac{1}{2}[\cos (b-c) - \cos (b+c)]}$$

or (8) $$\cos A = \frac{\cos a - \frac{1}{2} \cos (b-c) - \frac{1}{2} \cos (b+c)}{\frac{1}{2}[\cos (b-c) - \cos (b+c)]}$$

since $$\tfrac{1}{2} \cos (b+c) - \cos (b+c) = -\tfrac{1}{2} \cos (b+c)$$

by substitution:

(9) $$\cos A = \frac{\cos a - \cos (b+c) - \frac{1}{2} \cos (b-c) + \frac{1}{2} \cos (b+c)}{\frac{1}{2}[\cos (b-c) - \cos (b+c)]}$$

and thus:

(10) $$\cos A = \frac{\cos a - \cos (b+c) - \frac{1}{2}[\cos (b-c) - \cos (b+c)]}{\frac{1}{2}[\cos (b-c) - \cos (b+c)]}$$

Then by adding 1 to both sides of the equation and simplifying, we have:

(11) $$\cos A + 1 = \frac{\cos a - \cos (b+c)}{\frac{1}{2}[\cos (b-c) - \cos (b+c)]}$$

or by multiplying both sides by (½):

(12) $$\frac{\cos A + 1}{2}, \text{ or } \frac{\cos A - (-1)}{1 - (-1)} = \frac{\cos a - \cos (b+c)}{\cos (b-c) - \cos (b+c)}$$

which is an equation of the straight-line form of

(13) $$\frac{x - x_1}{x_2 - x_1} = \frac{y - y_1}{y_2 - y_1}$$

where $x = \cos A$  $x_1 = (-1)$  $x_2 = (1)$ $y = \cos a$  $y_1 = \cos (b+c)$  $y_2 = \cos (b-c)$ II. Similarly the formulas interrelating the three angles A, B, and C and side $a$ are as follows:

(14) $\cos A = -\cos B \cos C + \sin B \sin C \cos a$ and

(15) $$\cos a = \frac{\cos A + \cos B \cos C}{\sin B \sin C}$$

by multiplying both sides of the equation by (−1) and noting that minus the cosine of an angle equals plus the cosine of 180° minus the angle we have:

(17) $$\cos (180^\circ - a) = \frac{\cos (180^\circ - A) - \cos B \cos C}{\sin B \sin C}$$

which equation is identical in form to Equation 2, and by substituting the corresponding variable of Equation 17 in Equation 2 by the same derivation Equation 12 becomes:

(18) $$\frac{\cos (180^\circ - a) - (-1)}{1 - (-1)} = \frac{\cos (180^\circ - A) - \cos (B+C)}{\cos (B-C) - \cos (B+C)}$$

which is likewise an equation of a straight line of the two point form of Equation 13 where:

$x = \cos (180^\circ - a)$  $x_1 = (-1)$  $x_2 = (1)$ $y = \cos (180^\circ - A)$  $y_1 = \cos (B+C)$  $y_2 = \cos (B-C)$ III. In considering the third equation of the principal spherical triangle formulas we note that the sine of an angle equals the cosine of 90° minus the angle; thus:

(20) $$\frac{\sin A}{\sin a} = \frac{\sin B}{\sin b}, \text{ or } \frac{\cos (90^\circ - B)}{\cos (90^\circ - b)} = \frac{\cos (90^\circ - A)}{\cos (90^\circ - a)}$$

which is of the two point form of Equation 13, where the third point is at the origin, since $x = \cos (90^\circ - B)$  $x_1 = (0)$  $x_2 = \cos (90^\circ - b)$ $y = \cos (90^\circ - A)$  $y_1 = (0)$  $y_2 = \cos (90^\circ - a)$ IV. Thus the straight line nature of these formulas, in addition to the fact that all variables are cosines or fixed digits, results in the fact that these equations can be solved by use of nomographs, mechanical lever and gear systems, or mechanical-optical and mechanical-electrical systems. Since all functions are cosines, cosine gears used in other computers can be used. One application of this information is to the use in solving navigational problems.

Figure 14:
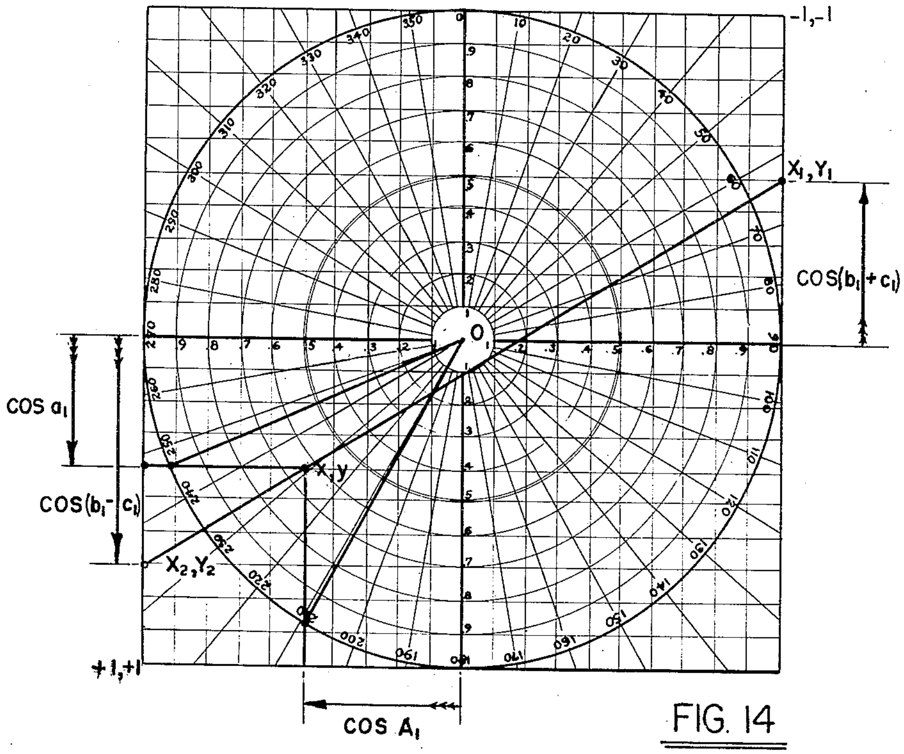
Fig. 14 illustrates a graphic solution of a straight-line formula representing the relation between four determinate values of a spherical triangle, which is performed mechanically by the device shown in Figs. 1 to 3.

The straight-line formula arrived at in the above computations, as shown e. g. in Equation 12, having the form of the general Equation 13, may be plotted on cross-section paper or on a chart having four one-unit squares with their corners joined together at the center of the chart, which may be denoted as the origin. Since the above equation is limited to cosine values, it was found that any problem based on this formula may be solved on this chart by plotting the values of the cosines of $(b+c)$ and $(b-c)$ along the two opposite edges of this chart and connecting these points by a straight line, then drawing a horizontal line from a point having an ordinate value representing cos $(a)$, which may be measured along the edge where the cos $(b-c)$ was measured, to intersect the first line drawn, and then drawing a vertical line from this intersection down to the base of the chart. The value for cos (A) is the abscissa of this intersection and may then be read along the base of the chart from the center line or $y$-axis to this vertical line. To aid in understanding this solution, the standard Mooring and Maneuvering board adopted by the Navy might be used, and is very adaptable to show the solution of these problems, since a circle of unit radius is inscribed thereon and assists in following the values of the cosines which are to be plotted. Fig. 14 shows an illustrative graphical solution on the standard Mooring and Maneuvering board.

Taking a specific problem in this illustration, where the values of $a_1$, $b_1$ and $c_1$ are known, to find $A_1$, e. g.:

Assuming $a_1=66\frac{1}{2}°$
$b_1=98°$
$c_1=52°$ then $b_1-c_1=46°$
$b_1+c_1=150°$ from Equation 12

$$\frac{\cos A_1-(-1)}{1-(-1)}=\frac{\cos a_1-\cos (b_1+c_1)}{\cos (b_1-c_1)-\cos (b_1+c_1)}$$

which is of the general straight-line form $$\frac{x-x_1}{x_2-x_1}=\frac{y-y_1}{y_2-y_1}$$

in which $x=\cos A_1 \quad x_1=-1 \quad x_2=+1$ $y=\cos a_1 \quad y_1=\cos (b_1+c_1) \quad y_2=\cos (b_1-c_1)$ We can then plot the points $x_1$, $y_1$ and $x_2$, $y_2$ which will fall on the side edges of the chart, since the edges are at a unit's distances along the $x$-axis from the origin O at the center of the chart. To locate these points, $y_1$ or $\cos (b_1+c_1)=\cos 150°=-\cos 60°=-.5$ is measured from the $x$-axis in the negative direction or upward on this chart to the level of the 60° point on the unit circle measured from the negative vertical axis. Therefore this 60° point may be carried over horizontally to the $x=-1$ edge to locate the point $x_1$, $y_1$. $x_2$, $y_2$ may be similarly located on the opposite edge as shown in Fig. 14, by carrying over the 226° point on the unit circle which is equivalent to 46° measured from the positive vertical axis, horizontally over to the $x=+1$ edge to get the location $x_2$, $y_2$. Knowing the value of $a_1$, $y$ or cos $a_1$ may be located on the line passed through $x_1$, $y_1$, and $x_2$, $y_2$ by carrying over the 246½° point on the circle which is equivalent to 66½° measured from the positive vertical axis, horizontally to that line. The distance that this point $x$, $y$ is from the vertical axis is cos $A_1$, which equals $x$, and by carrying this point vertically to the unit circle the value of $A_1$, may be determined by measuring the angular value of this point on the circle from the horizontal axis. In the present example this is found to be 61° for the value of $A_1$.

If the value of $A_1$ were known instead of that of $a_1$, cos A would be used to locate point $x$, $y$ from which $a_1$ could be graphically determined in an obvious manner. Likewise by a similar process using one of the basic straight-line Equations 12, 18 or 20 any of the values $B_1$, $C_1$, $b_1$ or $c_1$ may also be determined from any other three known values defining a spherical triangle. With reference to Equation 20, it was known that it may also be considered of the same straight-line form as the above equations, assuming one point $(x_1, y_1)$ is at the origin instead of at one of the sides of the chart. This solution is otherwise the same.

In order to carry out these graphical solutions mechanically without the use of pencils and charts, it was found that the mechanism herein disclosed as the novel devices proved to be very effective and accurate. The device shown in Figs. 1 to 3 was found to be accurate to within 10′. The device is easily operated within a suitable range so as to be useful for many purposes, particularly for navigation in aircraft where the pilot has insufficient space and time for use of charts in solving his navigational problems. A device of this type may be readily installed on a part of the instrument board or carried separately as a unit, without taking up much space.

Figure 2:
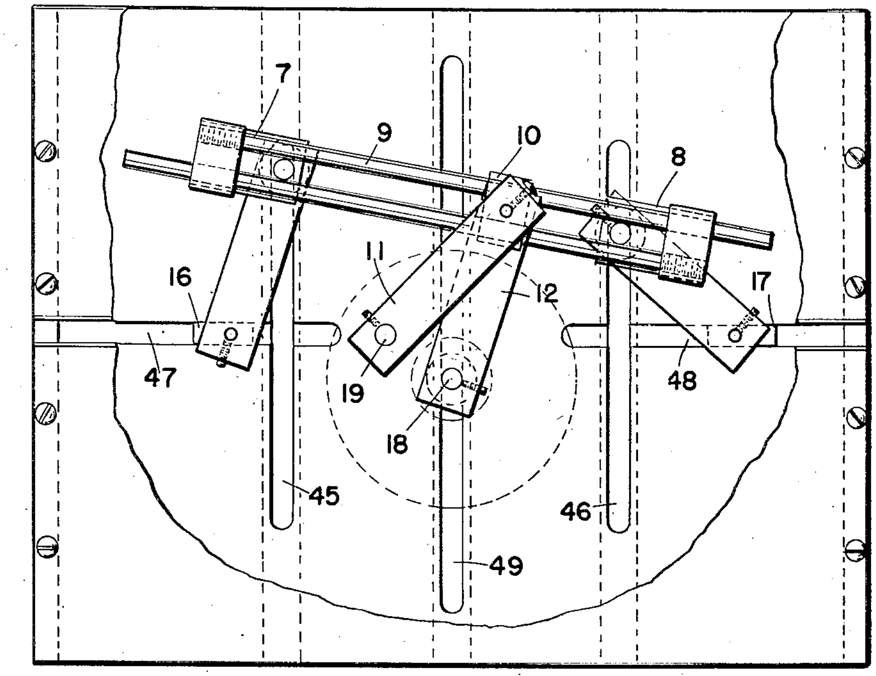
Figures 3, 3A:
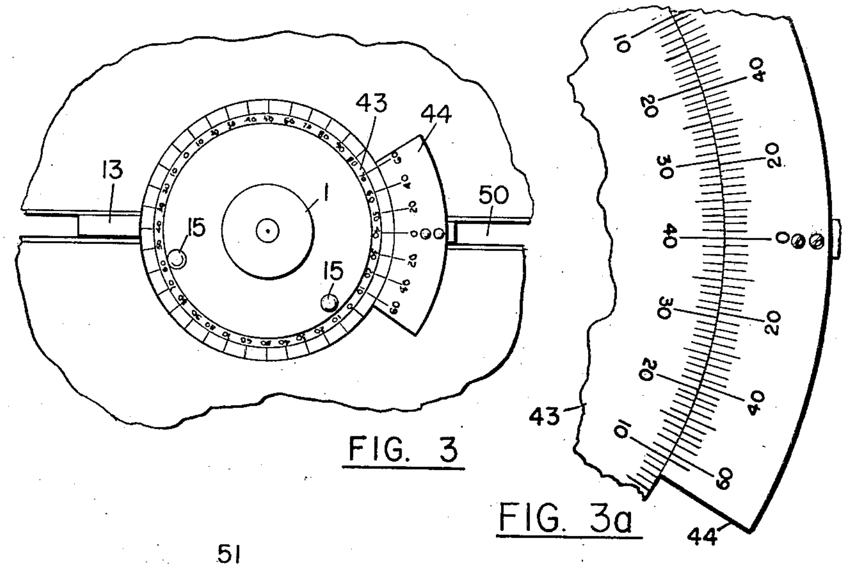

The present device in its basic form as shown in Figs. 1 to 3 is a mechanical means for indicating the four relative values which will always define some spherical triangle in accordance with this straight-line form of graphical solution which may be performed mechanically and automatically thereby. The mechanism is so constructed that values of $a$, $b$, $c$, and the corresponding values of A, B, or C, or A, B, C, and the corresponding value of $a$, $b$, or $c$, which may be quickly determined, are always automatically indicated on the dials regardless of how any or all of them may be manually shifted. Thus by adjusting any three of the dials in accordance with known values of three of the factors of any spherical triangle, the fourth dial is simultaneously automatically shifted through the mechanical connections of the mechanism to indicate the corresponding fourth value desired, in accordance with the application of the proper values to the dials, corresponding to the values of $y_1$, $y_2$, $x$ and $y$; $x_1$ and $x_2$ being always +1 and −1 respectively or vice versa.

Figure 5:
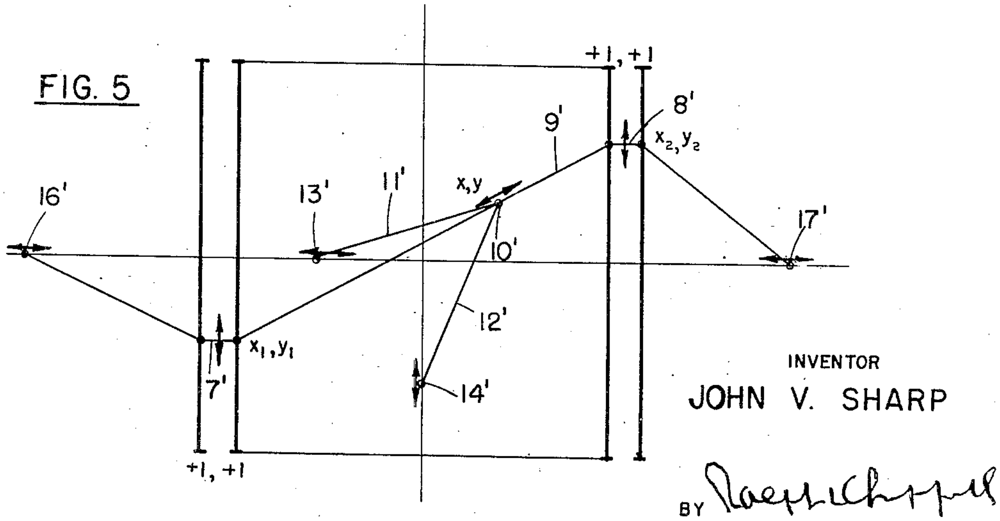
Fig. 5 is a diagrammatic illustration of the relative movements of the parts of the mechanism shown in Figs. 1 to 3.

Fig. 5 shows diagrammatically the arrangement and construction of the parts of the basic device. The pivoted and sliding elements are numbered similarly to the corresponding parts in the device shown in Figs. 1 to 3. The vertically slidable members 7′ and 8′ at the sides correspond to members 7 and 8 in the device slidable in vertical slots 45 and 46, respectively, and determine the position of the line 9′ between them corresponding to rod element 9. Their vertical adjustment is caused by turning pivoted arms of unit length thereon, based on a distance of two units between the vertical sides, the other ends 16' and 17' of these arms, respectively, being restricted to motion along the horizontal axis of the diagram. This is made possible in the device by means of the pivoted sliding members 16 and 17 slidable in the horizontal slots 47 and 48, respectively. The range of turning movement of these arms about the pivots 7 and 8 may be limited to 180° by extending the slots 47 and 48 only to one side of the vertical slots. Although these slots extend outwardly from the vertical slots in the construction shown, they could obviously be made to extend inwardly for compactness, if desired, without altering the principle of operation.

The member 10' slides on rod member 9', and two arms of unit length 11' and 12' pivoted to it have their other ends pivoted in slides 13 and 14, sliding in horizontal and vertical slots respectively. It may thus be seen that the mechanism is arranged to carry out the steps of the graphical solution mechanically and automatically with the aid of dials attached to the pivot points as shown in the device of Figs. 1 to 3 to indicate the relative angular position of the several arms.

Referring to Figs. 1 to 3, the pivot points at 7 and 8 are rigidly connected to the respective arms and to dials having knobs 41 and 42 respectively and set screws 15, for adjustably turning and locking the arms in any adjusted angular positions, indicated by reading the scales on the dials with reference to a zero mark, and on the vernier scale similar to that shown at 44 in Fig. 3, fixed to the corresponding slide, such as 13 in Fig. 3.

In a similar way the pivot points at 19 and 18 are fixed to arms 11 and 12, and dials with knobs 1 and 2, to indicate the angular positions of these arms.

To operate the device it is then merely necessary to release all set screws and adjust each of three of the knobs to angularly position the corresponding arms in accordance with the problem presented and to lock them in such position, permitting the fourth arm to automatically assume the position determined by the mechanical sliding and pivotal connections of the device, which position will be indicated on the fourth dial, giving the result desired for the value of the fourth factor sought in the problem, as already explained in connection with the graphical solution above.

Figure 18:
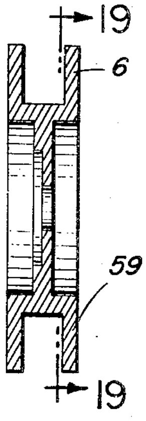
Figs. 18 and 19 are details of the differential mechanism used.
Figure 19:
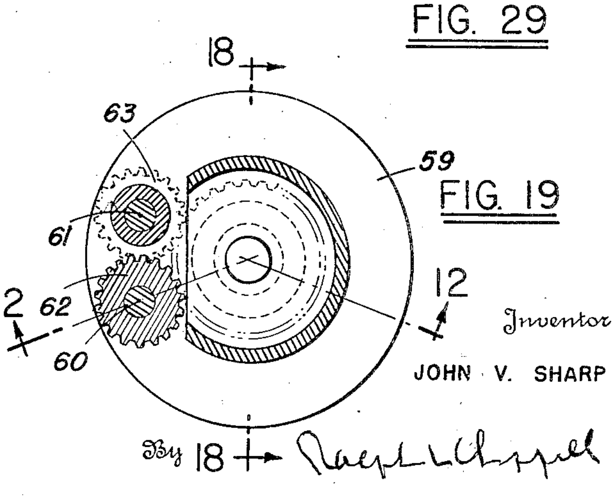

It will be noted that in the above solutions of the equations, the values of the sum and difference of two of the sides of the triangle, or of two of the included angles were used. In order to work with the dial adjustments of the values of the sides or angles of the triangle directly and independently of each other, it is only necessary to join the two mechanisms operated by the knobs 41 and 42 for indicating these sums and differences, by a differential gear connection so that the values of the sides may be directly indicated instead of their sums and differences. Such differential gear connection is incorporated, as shown at 6, in the form of device illustrated in Figs. 6 and 7, and is shown in more detail in Figs. 12, 18 and 19.

Figures 8, 9, 10, 11, 12:
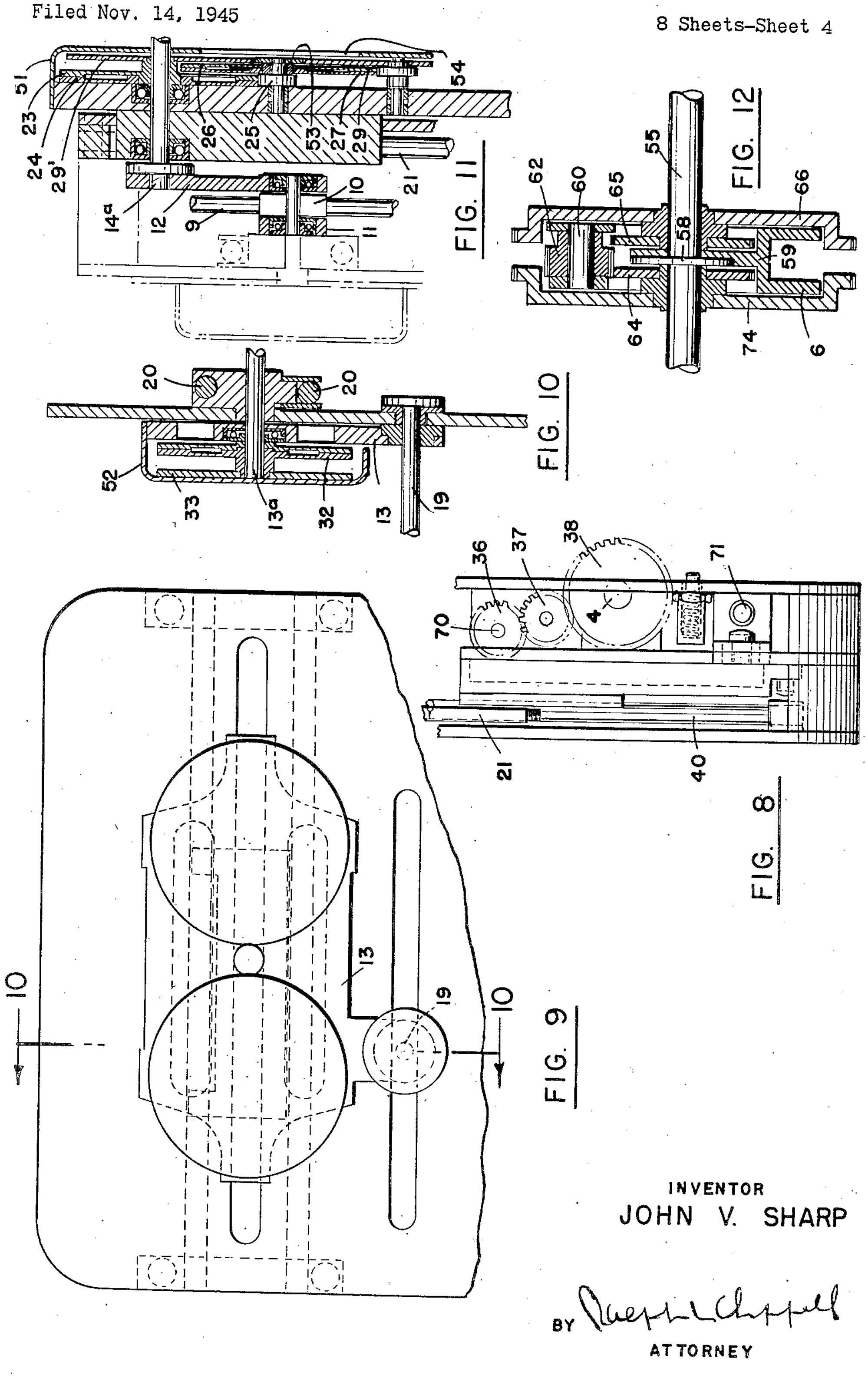
Fig. 8 is a partial view taken at 8—8 of Fig. 6.
Fig. 9 is a partial view of one face of the instrument of Fig. 4 showing the vernier gear and dial arrangement of the horizontally movable pivoting element.
Fig. 10 is a sectional view taken at 10—10 of Fig. 9.
Fig. 11 is a sectional view taken at 11—11 of Fig. 6.
Fig. 12 is a section of one of the differential gear units taken e. g. at 12—12 of Fig. 6.
Figure 16:
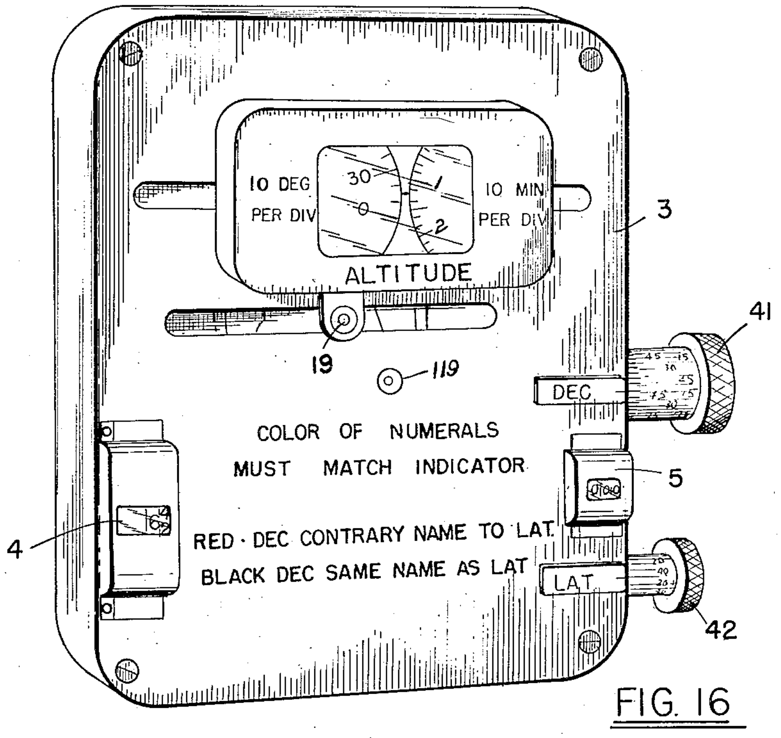
Figs. 16 and 17 are opposite face views of a finished instrument of the type illustrated in Figs. 4 and 6 to 12.

The knobs 41 and 42 on the outside of the casing 3 of this instrument are connected to the geared indicator mechanisms 4 and 5, showing the values of independent variables, and are internally connected through the differential gearing 6 to the sum and difference slides 7 and 8, which adjust the position of the straight-line rod element 9 across the instrument. The pivoted slide member 10 is moved on this straight-line rod element by the arms 11 and 12 connected to the other two indicators representing the other two variables in the problem just as in the device of Figs. 1 to 3. The indicators in the present device, contained in housing 51 and 52 of Fig. 4 and detailed in Figs. 9, 10 and 11, are modified by gearing up the angular motions of the arms 11 and 12 through shafts 13*a* and 14*a* to high precision vernier dials 33 and 54, through a spring loaded gear drive, to obtain precise readings. The indicators for inputs 41 and 42 are shown in Fig. 16 for which one revolution is equivalent to 4° in 15 minute increments indicated on the dial. These knobs drive shafts 70 and 71 which drive gear trains 36, 37, 38 and 75, 76, 77 respectively, to drive counters in housings 4 and 5, which count the degrees of input made by knobs 41 and 42. Fig. 8 details one of these friction loaded gear trains and has omitted the housing 53, which normally accommodates a part of the gear 38.

Figure 15:
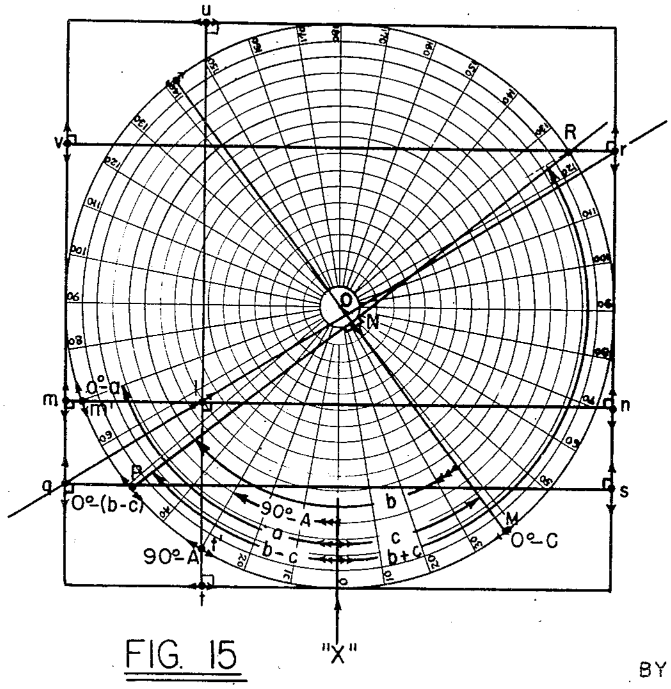
Fig. 15 illustrates a graphical solution similar to the above but carried out further to solve for any of the unknown values directly instead of using the sum and difference of two of the values, as is obtained mechanically in the more complete form of the instrument shown in Figs. 4 and 6 to 12.
Figure 13:
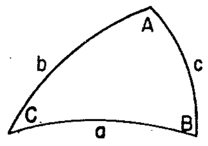
Fig. 13 is an illustration of a general form of spherical triangles showing the common way of designating the sides and corresponding opposite angles thereof constituting the six variables which may define any spherical or plane triangle.

Fig. 15 is a graphical representation of the solution of spherical triangle problems showing the relation between the sum and difference of two of the values used in the problem to the individual values themselves. Upon this relation is based the differential connection in the last described device for providing indications of these individual values instead of their sum and difference.

In this figure, a bisector OM of the angle ROP is laid out, the angle ROP being the sum of the sum and difference of the two values $b$ and $c$, or $(b-c)+(b+c)=2b$, so that one-half of this total sum is equivalent to $b$.

This figure further shows a modified mechanism which may be used to move the slide 10, denoted in this figure by $l$. This slide is movable along the straight-line member denoted here as $q$—$r$. The terminals $q$ and $r$ being the equivalents of the pivots 7 and 8, are adjusted by members $q$—$s$ and $v$—$r$ respectively which are vertically slidable across the diagram as indicated by the double arrows at their ends, but are restricted to maintain perpendicular relation to the sides of the diagram. Mechanical bars could obviously be constructed with proper slide connections and indicators to indicate the corresponding angular values as desired. The bars represented by $u$—$t$ and $m$—$n$, which are movable horizontally and vertically over the diagram respectively, have sliding connection with the pivoted slide 10 on the straight-line rod $q$—$r$ so as to maintain their point of intersection over the straight-line rod $q$—$r$.

In the solution of problems involving triangles, some of whose sides or included angles are more than 90°, it may be necessary to work on the corresponding complementary triangle which has smaller sides or angles. However, in navigation such of the points of observation can ordinarily be selected as to present problems involving triangles having sides and angles substantially not greater than 90°.

Figures 6, 7:
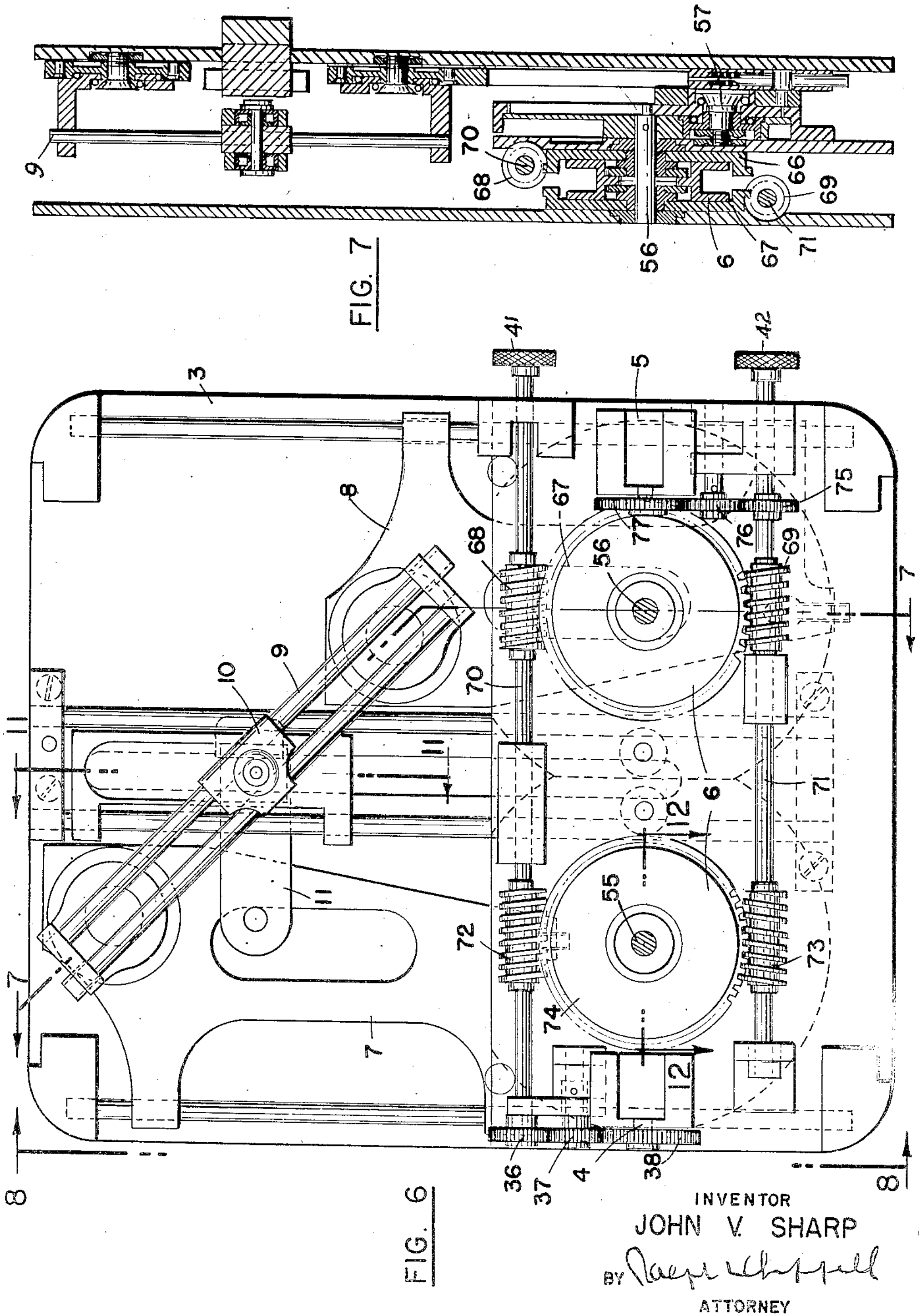
Fig. 6 shows another view of the construction and arrangement of parts used in the instrument shown in Fig. 4.
Fig. 7 is a section taken at 7—7 of Fig. 6.

The differential mechanism previously referred to comprises two sets of differential gearing, the shaft 55 of one set being connected to operate one of the vertically adjusted slides 7, the shaft 56 of the other set being connected to operate the other slide 8, through two equal length levers, one connecting shaft 56 of Fig. 7 with floating shaft 57, and the other connecting shaft 57 with the pin which drives 7 (and similarly 8) in a linear direction. This is known as a "cosine" lever drive.

Figure 17:
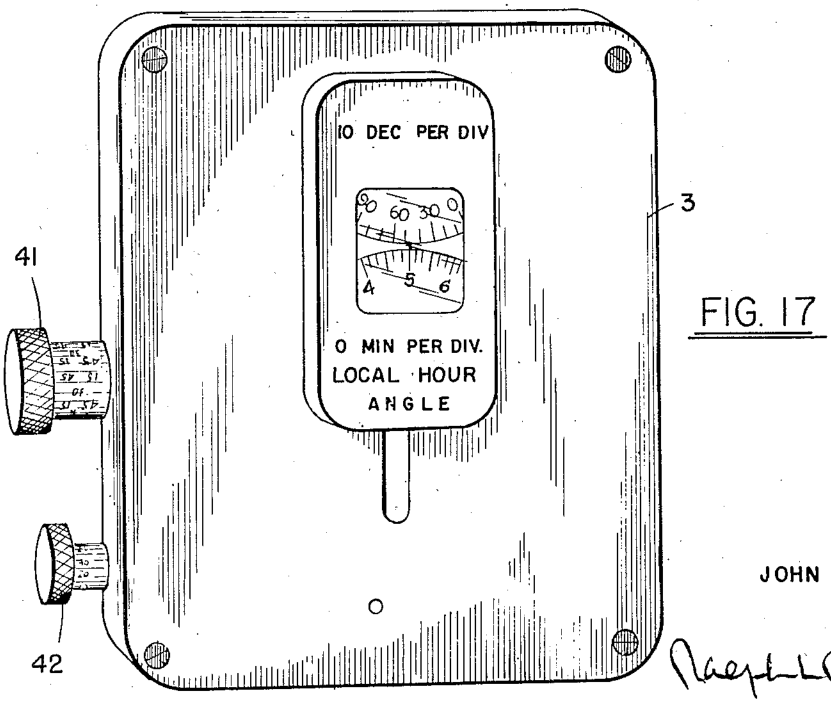

An examination of Figs. 6, 7, 12, 18 and 19 will show the train of gears in a differential unit such as used herein. The shaft 55, as may be more clearly seen in Fig. 12, is connected by a shoulder plate 58 to the spider member 59 which carries in it the pinion shafts 60 and 61 on which the pinion gears 62 and 63, respectively, are mounted. The pinion gears mesh with each other and one of them 62 meshes with the central gear 64 whereas the other 63 meshes with the central gear 65. Central gears 64 and 65 are fixed through hub members to the ring gears 74 and 66, respectively. The ring gears are driven by worms 72 and 73, respectively. The shaft on which the worm 72 is mounted has another worm 68 of the same hand thereon and an operating knob 41 on the outer end thereof for operation of both worms simultaneously. The shaft which carries the worm 73, which by the way, is of the opposite hand, carries another worm 69 which is of the same hand as worms 72 and 68. A knob 42 is fixed to the end of shaft 71 for simultaneous operation of worms 73 and 69. The worms 68 and 69 operate the ring gears 66 and 67, respectively, in the other differential unit. Thus it may be seen that the ring gear units, each comprising a ring gear 66 and a spur gear 65 fixed thereto, on one side of both differential units are operated in the same direction simultaneously by turning the knob 41 whereas the ring gears 74 and 67 are operated in opposite directions by the worms 73 and 69, respectively when the knob 42 is turned. As a result the shaft 55 of one of the differentials will be turned an amount represented by the difference between the degrees of turning imparted to the knobs 41 and 42 whereas the shaft 56 of the other differential will be turned in accordance with the sum of the degrees of turning imparted to these knobs. Thus the motion delivered to the slides 7 and 8 by the shafts 55 and 56 through the pin and slide connections 57 will represent the cosine values of the difference and sum of the independent inputs imparted to the knobs 41 and 42. The values of these inputs will be directly indicated by the indicators 4 and 5, respectively. Thus, the position of the straight-line guide 9 is determined by the positioning of the two slides pivotally connected to its ends, and the slide 10 on the guide 9 will be positioned in accordance with the angles to which the links 11 and 12 are turned. These links have one of their ends pivoted to this slide 10, the other end of link 11 being pivoted at 19 to a horizontal slide 13 whereas the other end of the link 12 is pivoted at 18 to a vertical slide 14, along the central axes. The values of the angles maintained by the links 11 and 12 are indicated by dials visible from the outside of the casing and driven through speed increase mechanisms to enable highly accurate readings of these angles on vernier scales. The dials may be more clearly seen in Figs. 16 and 17 where the angle at the horizontally sliding pivot is maintained by the dial marked "altitude" in the instrument illustrated, and the angle at the vertically sliding pivot is indicated by the dial marked "local hour angle." The input knobs 41 and 42 in this instance are designated as "declination" and "latitude," respectively, their values being shown by the counter-type indicators at 4 and 5, respectively. A locking mechanism operated by the knob 2 is provided for fixing the altitude value given by the problem at hand, the latitude and declination knobs are properly adjusted to the values given in the problem and then the dial on the other side of the instrument is read to immediately and automatically show the local hour angle involved in the triangle of the problem. As previously mentioned, any three of these inputs may be adjusted for in accordance with a particular problem in spherical triangulation and the corresponding fourth value will be immediately evident from the fourth indicator since the instrument is so made that the four values are mechanically co-related so as to maintain values of four of the factors which will always define a particular triangle.

Figure 21:
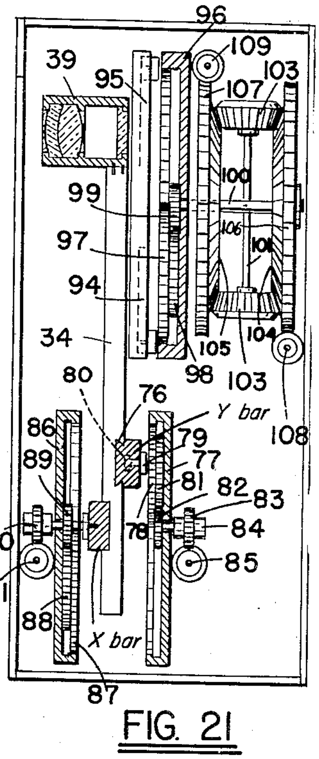

Gears 77, 86 and 96 of Fig. 21 are stationary members of a gear train, usually called "sine" gears, but used in the present device as "cosine" gears, a special form of the general class of epicyclic gear trains.

Generally in navigation, the use of "90 degree minus the given angle" for the sides of a spherical triangle is desirable. This is done on the indicators shown in Figs. 16 and 17 by simply replacing the numbers for the true value by 90 minus their value. Thus, since declination and latitude must be either like or opposite, a small circular indicator 119 in the center of Fig. 16 is automatically made to appear red or black. The numerals in the indicator 4 are four in number, two red and two black. The cover in indicator 4 slides so as to cover the red set of numerals or the black ones. When the number indicated is the same color as shown in indicator 119, declination and latitude are on the side of zero, namely north or south of zero (the Equator). The disc below the window of 119 in the instrument is half red and half black and is automatically shifted from one side to the other as the value of either the declination or the latitude is shifted across zero.

Figure 4:
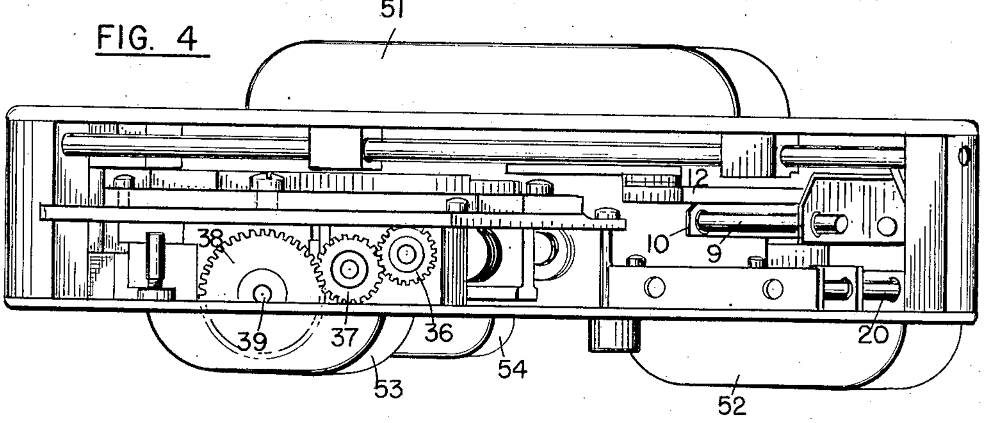

Fig. 4 shows the geometric interrelation of Figs. 8, 9, 10 and 11. Figs. 9, 10 and 11, and the gearing previously defined in connection with the knobs 41 and 42, are closely related, and concern duplicate indicating mechanisms contained in housings 51 and 52, shown in Fig. 4 and in Figs. 12 and 10 respectively. The circles of Fig. 9 are the indicating discs geared together by a spring loaded gear train shown in Fig. 10. Disc 33 of Fig. 10 represents the side view in section of both discs. Discs 29' and 54 of the duplicate mechanism are identical in function and size. These discs contain the numbered scales shown in Figs. 16 and 17, marked for indicating Local Hour Angle and Altitude respectively.

Figs. 9 and 10 are plan and sectional views of the duplicate mechanisms of the upper part of Fig. 11. Thus, Fig. 11 shows shaft 14 holding disc 29' and gear 23 which (with the spring loaded companion 24) drive gear and shaft 25. Shaft 25 holds gear 29 and its spring loaded companion gear 27, which drives the gear and shaft supporting disc 54. 53 is a plate which contains the reference marks shown in Figs. 16 and 17. The circular cavities between 23 and 24, and between 27 and 29 contain the small wire spring.

Figure 20:
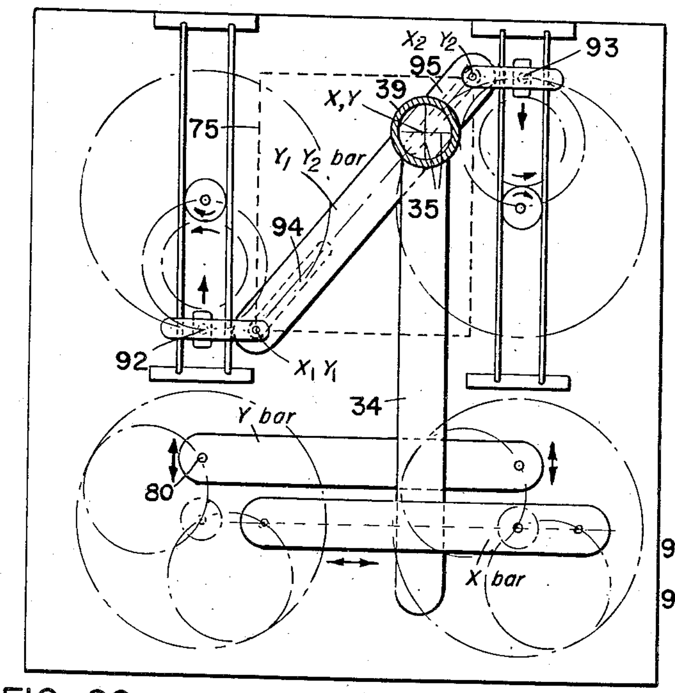
Figs. 20 to 22 are three views of another form of the instrument using one type of visual cross-hair alignment means.
Figure 22:
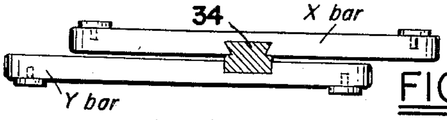

Referring to Figs. 20, 21 and 22 another form of operating mechanism is shown to perform the same operations, although in this case the intersection between the straight-line guide and the rectangular co-ordinates of the point $x, y$ is not mechanically maintained. The intersection has to be adjusted for before the readings are taken to obtain the solution to the problem. The intersection is determined by adjusting cross-hairs through a sighting mechanism, one cross-hair being on the center line of the straight-line guide, the other two cross-hairs being in the sighting mechanism which is adjustable vertically and horizontally in accordance with the co-ordinate values of the point sought.

Figure 23:
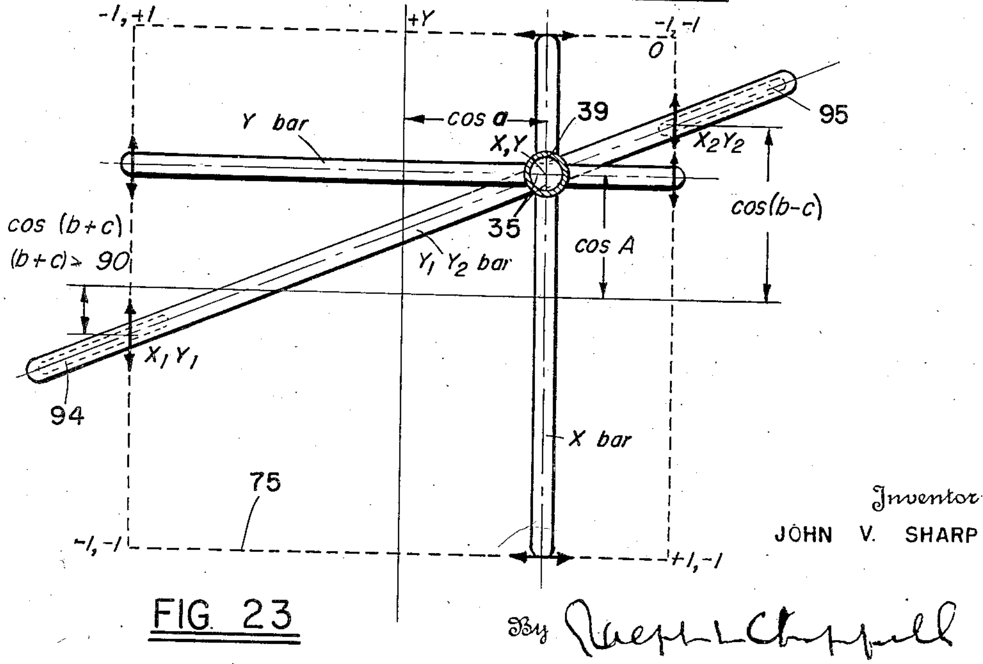
Fig. 23 is a diagrammatic illustration of the mechanical movements used and the values represented by the relative distances indicated.

The solution of the general problem is spherical triangulation in accordance with the present invention may be resolved into a graphical solution as previously pointed out using three points on a straight line: $x_1, y_1$ at one side of a two unit square graph, having an ordinate value representing cos $(b+c)$, $x_2, y_2$ at the other side having an ordinate value of cos $(b-c)$, and $x, y$ on the line $(x_1, y_1)-(x_2, y_2)$, having an ordinate value of cos A and an abscissa value of cos $a$. These are the graphical relationships expressed by the straight-line formula for any spherical triangle, as already pointed out, and are plotted in Fig. 23 for a set of values for one particular spherical triangle. This figure also shows diagrammatically the movable bars used in the mechanism of a device such as illustrated in Figs. 20 to 22. These bars are superposed on the pertinent graph lines in Fig. 23. In the form of mechanical device illustrated in Figs. 20 to 22, instead of directly superposing the vertical and horizontal bars over the $(y_1, y_2)$-bar for obtaining a common intersection, a vertically and horizontally movable bar 34 has a pair of perpendicular cross-hairs 35 in the eye piece 39 mounted at the upper end thereof for adjustment over the $(y_1, y_2)$-bar. This bar is movable by translation in vertical and horizontal directions by the more remotely placed $y$-bar and $x$-bar respectively so that the cross-hairs may be moved to any part of the square indicated by dotted lines 75 representing the extent of the four unit-square graph. The bar 34 is slidably mounted for vertical movement in the $x$-bar and has a horizontal groove 76 for horizontal sliding movement over the $y$-bar whereby vertical adjustment of the $y$-bar will move the cross-hairs vertically over the graph space 75 whereas horizontal adjustment of the $x$-bar will move the cross-hairs horizontally thereover, for independent translation of the cross-hairs vertically or horizontally without interference between these motions. The $x$-bar and $y$-bar are pivotally mounted at their ends on the peripheries of internal planetary gears of unit pitch diameter operating in stationary internal ring gears having diameters of two units, in such manner as to provide the necessary translation so as to furnish the $x$-bar a total of two units of horizontal movement and the $y$-bar a total of two units of vertical movement. The arrangement of the planetary and ring gears is indicated in Fig. 20 by the pitch circles of their teeth and is fully shown in section in Fig. 21. One of the ring gears for the $y$-bar may be seen at 77, the corresponding internal planetary gear is shown at 78 which has a lug 79 on which the pivot 80 for one end of the $y$-bar is mounted on the pitch circle of the gear. This planetary gear is driven by a spur gear 81, fixed axially thereon, through the spur gears 82 and worm gear 83 on the shaft 84 by operation of the worm 85. A similar gear train is used for the other end of the $y$-bar and a worm 85 mounted rigidly on the same shaft operates this other train of gears simultaneously so as to provide a parallel motion of the two pivots in a vertical direction diametrically with respect to the internal ring gears. A similar pair of gear trains 86, 87, 88, 89, 90 and 91 is provided for each end of the $x$-bar which is pivoted to lugs on the pitch circles of the internal planetary gears 87 at points which will follow a horizontal path diametrically of the internal ring gears.

The $(y_1, y_2)$-bar has a center line marked thereon and has axial grooves 94 and 95 near its ends for slidable connection to pivots which are mounted at $x_1, y_1$ and $x_2, y_2$ on vertically guided slide members 92 and 93 respectively, which are in turn pivotally connected to lugs on the pitch circles of internal planetary gears of unit diameters operating in internal ring gears having diameters of two units in such manner as to provide independent vertical motion to the slide members by operation of these ring gears. The pitch circles of the gears are indicated in Fig. 20 and the gears of the unit on the left side are shown in full in Fig. 21, the ring gear 96 being shown in section. The internal planetary gear 97 has a spur gear 98 rigidly connected thereto in axial relation which is driven by spur gear 99 from the spider shaft 100, the spider 101 being provided with planetary bevel gears 103 which are meshed with the bevel gears 104 and 105. The bevelled gears 104 and 105 are fixed axially to operating worm gears 106 and 107 for operation by worms 108 and 109 respectively. The gear unit at the right side in Fig. 20 is similar in construction and its worms are driven simultaneously with the worms 108 and 109 for adjusting the ordinate values of the ends of the $(y_1, y_2)$-bar. The worms on one of the worm shafts and one of the worms on the other worm shaft are all of the same hand whereas the fourth worm is of the opposite hand whereby the amount of turning of these shafts will be added in one gear unit and subtracted in the other to give the corresponding ordinate values representing cosines of the sum and difference of the angles represented by the amount of independent turning of the two shafts. It is obvious that indicators having the proper scales may be connected to the four worm shafts in this device to show the degree of relative turning of each of the four shafts in accordance with the corresponding four values defining any spherical triangle. These indicators may be designed to show these four values defining a spherical triangle in accordance with the straight-line formula in the same way as the device hereinbefore described. The difference in operation in the present form of the device, however, is that the mechanism for operating the $x$-bar and $y$-bar is not mechanically inter-linked with the mechanism of operating the $(y_1, y_2)$-bar and their relation has to be adjusted for with the assistance of the sighting mechanism to line up the mechanism before a problem can be solved. Thus in the general problem represented by the straight-line formula $$\frac{\cos A-(-1)}{1-(-1)}=\frac{\cos a-\cos (b+c)}{\cos (b-c)-\cos (b+c)}$$

the values of $b$ and $c$ are adjusted for by the shafts on which the worms 108 and 109 are mounted and the value of $a$ is adjusted for by turning the shaft on which worm 91 is mounted, then the shaft on which the worm 85 is mounted is adjusted to raise or lower the cross-hairs 35 until they intersect the center line marked on the ($y_1$, $y_2$)-bar. When this is done, the indicator operated by the shaft on which the worm 85 is mounted will show the corresponding value of A in the problem.

Figures 24, 26:
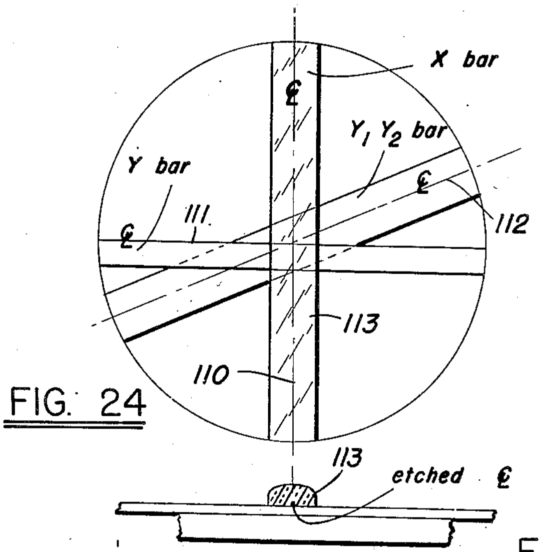
Figs. 24 to 26 are three views of another type of the visual cross-line alignment means that might be used.
Figure 25:
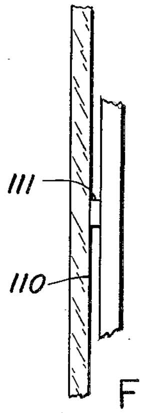
Figures 27, 28:
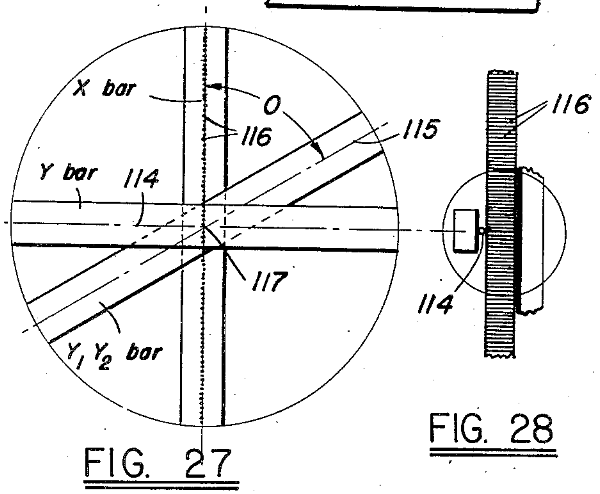
Figs. 27 and 28 are two views of an electrical contact type of alignment means.

The sighting and aligning mechanism in this form of device may take different forms, two of which are illustrated in Figs. 24 and 27 for use in mechanism wherein the $x$-bar and $y$-bar are directly superposed over the ($y_1$, $y_2$)-bar. Figs. 25 and 26 are sectional views of Fig. 24 and show the $x$-bar made of transparent material and having a center line 110 etched on its bottom side which is made to slide over the $y$-bar which is made comparatively thin, and an edge 111 on its upper side may be lined up with the axis of the pivots at its ends (not shown in this view) which are mounted and operated in a similar manner to that shown for the $x$-bar in Figs. 20 to 22. The $x$-bar is mounted for horizontal movement by means of a similar mechanism properly positioned for giving this bar a range of motion over the corresponding graph space. The ($y_1$, $y_2$)-bar has a center-line 112 marked along its axis and in operation this center-line 112, the upper edge 111 of the $y$-bar, and the center-line 110 etched on the bottom of the $x$-bar are brought to a common point of intersection in order to solve a problem in a similar way previously described. The $x$-bar may be formed in the shape of a magnifying bar-lens 113 for enlarging the lines viewed therethrough to assist in more accurate adjustment of the common point of intersection.

Figure 29:
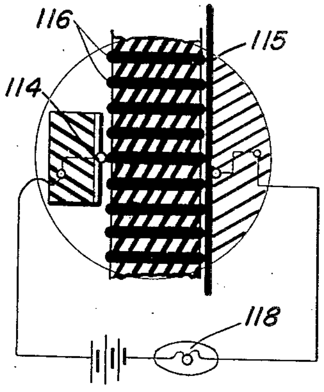
Fig. 29 is an enlarged detail view of the electrical contact alignment means showing the electrical circuit for indicating when the three lines intersect at a common point.

Fig. 28 is a sectional view of the form of alignment means shown in Fig. 27 wherein the bars are all formed of insulating material, the $y$-bar has a fine electrical conductor 114 axially mounted along its bottom surface which is maintained in contact with the upper surface of the $x$-bar, a similar fine electrical conductor 115 is positioned axially on the top of the ($y_1$, $y_2$)-bar which is maintained in sliding contact with the bottom surface of the $x$-bar. The $x$-bar has a series of fine electrical conductors 116 between the upper and lower surfaces thereof, and closely spaced along the axis of this bar, so that their ends are exposed on the upper and lower surfaces for contact with the axial conductors 114 and 115 on the other two bars. Whenever the two axial conductors are in contact with a common conductor in the $x$-bar the three pertinent lines representing the problem are necessarily lined up and form a common point of intersection 117. The axial conductors are connected to opposite ends of an indicator circuit as shown in Fig. 29, having a signal light 118 or other means for indicating the completion of the circuit through one of the $x$-bar conductors. Thus, in the operation of a device provided with this form of alignment indicating means the final operation for determining the unknown value is made by turning the final adjustment until the alignment indicator indicates that a common point of intersection has been acquired. In other respects the unknown value is solved for in the same way as in the other forms of the device.

Obviously, many other modifications in arrangements and construction of the elements in the device may be made without departing from the spirit and scope of this invention, which is defined in the appended claims.

The invention described herein may be manufactured and used by or for the Government of the United States of America for governmental purposes without the payment of any royalties thereon or therefor.

What is claimed is:

1. A computing device comprising means defining a square space representing coordinate values from −1 to +1 with respect to an origin at the center of the square, a cross rod, means for adjusting the relative vertical position of the ends of said cross rod to cross the sides of said square space at ordinate values corresponding to the cosines of the sum and difference respectively of any two adjacent elements in a spherical triangle problem, a slide member on said cross rod, a pair of links of unit length pivotally connected to said slide member at one of their ends, the other ends of said links having pivots, means for providing central vertical and horizontal guide slots across said space, a slide in each of said guide slots for each of said pivots at the other ends of said links respectively, and means for moving said slide member along said cross rod by angular adjustment of one of said links with respect to its horizontal slide according to the angular value of the included element in the spherical triangle problem, whereby the other link will automatically assume an angular position with respect to its vertical slide in accordance with the opposite element in the problem.

2. The combination defined in claim 1, and an indicating means connected respectively to said across rod adjusting means and to each of said slides, showing their relative angular positions within the range of movement of said means and said slides.

3. A comprising instrument having a base, a cross bar, vertically adjustable means on said base for positioning the ends of said cross bar, slide means on said cross bar, a pair of links pivotally connected to said slide means at one of their ends, a sliding block pivotally connected to the other end of each link, vertical and horizontal guide slots for said sliding blocks respectively, extending centrally across said base, said links being equal in length to one half the distance between the vertically adjustable means.

4. A computing instrument having an adjustable cross bar, and means defining a square space representing coordinate values from −1 to +1, vertically adjustable means on the sides of said square space for positioning said cross bar, slide means on said cross bar, a pair of links pivotally connected at one end to said slide means, slides pivotally connected to the other ends of said links, one of said slides being movable vertically across the middle of said space, the other horizontally thereacross, indicating means connected to each of said vertically adjustable means and to each of said slides connected to said links to indicate the relative positions of said vertically adjustable means and said links within their respective ranges of movement.

5. A computing instrument as defined in claim 4 and means for independently locking each of said indicating means.

6. A computer mechanism comprising a frame having a cross rod mounted by pin and slot connections thereon, said connections including two vertically adjustable pins at the sides of the frame slidable in longitudinal slots in the ends of said rod, means for adjusting said pins in accordance with the cosine values of the sum and difference of two of the sides of a spherical triangle respectively, the range of movement of said pins representing two units and being the same as the horizontal distance between said pins, a slide on said cross rod, and two indicator means for jointly moving said slide in accordance with the coordinate values within the square space between the ranges, representing the cosines of the third side and of its opposite angle in said triangle, as indicated on said two means respectively.

7. Means for mechanically solving spherical triangle problems, comprising a frame having a square operating space of two units length on each side, whereby any point in said space will have coordinate values between −1 and +1 with respect to the origin at the center of the space, a straight-line bar having movable pivots near its ends and mounted for adjustment across said space to cross its lateral sides at any ordinate values thereof, a link of unit length connected rigidly to each pivot and having a pivot pin at its other end, a vertical guide slot in said frame at each lateral side of said space for said movable pivots, horizontal guide slots in said frame aligned with the origin for said pivot pins, a circular dial fixed to each pivot, having a central knob for rotatably adjusting the corresponding link, locking means for fixing said dial and link with respect to the corresponding vertical slot, a slide on said straight-line bar having a pin, a pair of links of unit length pivoted at one of their ends to said slide pin, the other ends of said pair of links having pivot pins slidably mounted in central vertical and horizontal slots, respectively, in said frame.

8. In a computing instrument for mechanically solving spherical triangle problems, a frame, four angularly adjustable dials having operating knobs for setting them to any desired angular values, and interconnecting linkages comprising a straight-line bar adjustably mounted across a square space provided in said frame having coordinate values from −1 to +1 with respect to its central coordinate axes, means for vertically adjusting the ends of said straight-line bar to cross the sides of said square space at values corresponding to the cosines of the angles to which two of the dials are set respectively, a slide on said straight-line bar, and connecting means between each of said other two dials and said slide for simultaneously turning said other two dials to the angular values corresponding to the included and opposite elements respectively of a spherical triangle when the first two dials are set to angular values of the sum and difference respectively of the corresponding adjacent elements of the triangle.

9. Means defining a square space covering predetermined coordinate values from −1 to +1 with respect to the origin at the center thereof and the coordinate axes therethru, means for mechanically representing a straight line across said space, four angular dial means with operating knobs, connecting means between two of said dials and the ends of said straight line means respectively, for moving each end of the straight line means to cross the opposite sides of said space at ordinate values corresponding to the cosines of the angles indicated by the corresponding dials, slide means on said straight line means, and connecting means between each of said remaining two dials and said slide means for moving said last two mentioned dials horizontally and vertically respectively to follow said straight line means in accordance with the coordinate values corresponding to the cosines of the angles indicated by the respective dials.

10. In a computing device for spherical triangle problems where there are three determinate values comprising any two adjacent elements and either the included or the opposite element of a spherical triangle are known, means for determining the value of the fourth of these elements including the combiantion defined in claim 9, wherein the first two dials may be set to angular values dependent on known values of the adjacent elements of a predetermined spherical triangle, said connecting means includes a vertical movement member and a horizontal movement member, one adjusting dial being for the vertical movement member and another dial being for the horizontal movement member, and either the horizontal or vertical movement member adjusting dial may be set to the known value of the corresponding included or opposite element of said triangle, respectively, whereupon the angular value of the fourth element will be automatically shown by the fourth dial.

JOHN V. SHARP.

REFERENCES CITED

The following references are of record in the file of this patent:

UNITED STATES PATENTS

| Number | Name | Date |
|---|---|---|
| 318,578 | Patterson | May 26, 1885 |
| 378,257 | Leschorn | Feb. 21, 1888 |
| 537,782 | Lacoste | Apr. 16, 1895 |
| 754,086 | Nichols | Mar. 8, 1904 |
| 1,003,857 | Adams | Sept. 19, 1911 |
| 1,955,392 | Shimberg | Apr. 17, 1934 |
| 1,965,062 | Wellington | July 3, 1934 |
| 1,985,265 | Smith | Dec. 25, 1934 |
| 1,986,986 | Swartout | Jan. 8, 1935 |
| 2,179,822 | Imm | Nov. 14, 1939 |
| 2,220,399 | Fagerholm | Nov. 5, 1940 |
| 2,309,930 | Byerly | Feb. 2, 1943 |
| 2,378,981 | Chamberlain | June 26, 1945 |
| 2,421,965 | Pereira | June 10, 1947 |
| 2,506,251 | Thomas | May 2, 1950 |

FOREIGN PATENTS

| Number | Country | Date |
|---|---|---|
| 140,441 | Great Britain | Apr. 28, 1921 |
| 150,471 | Great Britain | Sept. 9, 1920 |